(12) United States Patent
Takeuchi (10) Patent No.: US 7,363,621 B2
(45) Date of Patent: Apr. 22, 2008

(54) PROGRAM CONVERTING APPARATUS, METHOD, AND PROGRAM

(75) Inventor: Mikio Takeuchi, Zama (JP)

(73) Assignee: International Business Machines Corporation, Armonk, NY (US)

( * ) Notice: Subject to any disclaimer, the term of this patent is extended or adjusted under 35 U.S.C. 154(b) by 578 days.

(21) Appl. No.: 10/739,730

(22) Filed: Dec. 18, 2003

(65) Prior Publication Data

US 2004/0210882 A1 Oct. 21, 2004

(30) Foreign Application Priority Data

Dec. 26, 2002 (JP) ............... 2002-377992

(51) Int. Cl.
*G06F 9/45* (2006.01)
(52) U.S. Cl. .................. 717/157; 717/143; 717/154
(58) Field of Classification Search ............... 717/151, 717/152, 154, 155, 159, 143, 157
See application file for complete search history.

(56) References Cited

U.S. PATENT DOCUMENTS

| | | | | |
|---|---|---|---|---|
| 5,701,489 | A * | 12/1997 | Bates et al. ................ | 717/157 |
| 6,151,706 | A * | 11/2000 | Lo et al. ..................... | 717/155 |
| 6,292,940 | B1 * | 9/2001 | Sato ............................ | 717/157 |
| 6,481,007 | B1 * | 11/2002 | Iyer et al. .................. | 717/151 |
| 6,751,791 | B2 * | 6/2004 | Inaba ......................... | 717/154 |
| 2003/0149969 | A1 * | 8/2003 | Ogasawara ................ | 717/158 |
| 2003/0237079 | A1 * | 12/2003 | Aggarwal et al. .......... | 717/158 |
| 2004/0015883 | A1 * | 1/2004 | Hundt et al. ............... | 717/131 |
| 2004/0015925 | A1 * | 1/2004 | Hanson et al. ............. | 717/155 |
| 2004/0019770 | A1 * | 1/2004 | Kawahito ................... | 712/227 |

FOREIGN PATENT DOCUMENTS

| | | |
|---|---|---|
| JP | 63-163636 | 7/1988 |
| JP | 10-040106 | 2/1998 |

OTHER PUBLICATIONS

Wen-mei W. Hwu and Pohua O. Chang, University of Illinois: Inline Function Expansion for Compiling C Programs.*

(Continued)

*Primary Examiner*—Tuan Dam
*Assistant Examiner*—Thuy Dao
(74) *Attorney, Agent, or Firm*—Cantor Colburn LLP; Lisa Yamonaco (57) ABSTRACT

Program converting methods, apparatus and systems including a code analysis unit for performing lexical and syntactic analyses of a source code of an execution program, an optimization unit for transforming this execution program, and an output code generation unit for converting the transformed execution program into a machine language code. In addition, this optimization unit detects a calling procedure and a called procedure in a procedure call of this execution program analyzed by the code analysis unit, guards an evaluation of an argument described in the called procedure under a predetermined evaluation condition, and transforms the execution program so that the evaluation is performed when referring to this argument.

3 Claims, 8 Drawing Sheets

OTHER PUBLICATIONS

Michael Ashley, University of Kansas: The Effectiveness of Flow Analysis for Inlining.*

Suresh Jagannathan and Andrew Wright, NEC Research Institute: Flow-directed Inlining.*

"Partial dead code elimination using slicing transformations", Bodik et al., 1997 (13 pages). Online retrieved at <portal.acm.org/citation.cfm?id=258930&coll=portal&dl=ACM>.*

Kelsey et al. "Revised5 Report on the Algorithmic Language Scheme," Higher-Order and Symbolic Computation, vol. 11, No. 1, Sep. 1998.

Knoop et al. "Partial Dead Code Elimination," Jun. 1994, pp. 147-158.

Muchnick, Steven S. "Advanced Compiler Design and Implementation," Morgan Kaufmann Publishers, Inc., 1997, pp. 592-597 and 465-470.

* cited by examiner

PROGRAM CONVERTING APPARATUS, METHOD, AND PROGRAM

FIELD OF INVENTION

The present invention relates to optimization processing executed in compiling a computer program.

BACKGROUND OF THE INVENTION

Among programming languages which describe programs for controlling data processing by a computer, in languages passing arguments by value, that is, most of procedural languages, a calling procedure (hereinafter, simply referred to as a caller) in a procedure call evaluates the entire arguments prior to the procedure call. This is referred to as an eager evaluation.

The eager evaluation of the arguments has an advantage in that a latency caused by evaluating the arguments can be overlapped with a latency of the procedure call and hidden by executing the argument evaluation in parallel to a computation of the caller itself, i.e., the eager evaluation is capable of reducing the delay substantially. On the contrary, the eager evaluation has a redundancy that arguments which are not actually referred to in a called procedure (hereinafter, simply referred to as a callee) in the procedure call are evaluated. Accordingly, development of a program requires a measure for excluding the redundancy while performing the eager evaluation of the arguments.

In Scheme, although the arguments are passed by value by default, it is also possible to switch to a lazy evaluation by promise. In addition, when creating a program, a programmer inserts appropriate conditions (hereinafter, referred to as evaluation conditions) derived from conditions for actually referring to the arguments of the callee (hereinafter, referred to as reference conditions) into the caller. Thus, it is made possible to perform the eager evaluation appropriately in accordance with whether or not the arguments are referred to by the callee. Then, the programmer himself inserts evaluation conditions into a source code of the caller, thus guarding the procedure call itself.

Furthermore, as a conventionally-used technique of optimizing a program, there is partial dead code elimination. This optimization moves an operation, that computes a value which is referred to only in a part of a subsequent control flow, immediately before an operation referring to the value, and eliminates partial deadness thereof. However, each of the conventional techniques has a problem as described below. A technique using the promise in the Scheme is executed in a system of switching the argument evaluation from the eager evaluation to the lazy evaluation by specifying a "delay" onto the caller and a "force" onto the callee. Therefore, this technique is accompanied with changes of source codes of both of the caller and callee, and is troublesome. Moreover, the evaluation is switched to the lazy evaluation, thus naturally losing the advantage of the eager evaluation, i.e. the latency of the argument evaluation can be hidden by the parallel execution and can be substantially reduced.

Additionally, in programming, the technique of inserting the evaluation conditions into the source code of the caller means that the reference conditions originally aggregated in the callee are distributed to a large number of the callers. Specifically, the evaluation conditions must be inserted into the entire callers which call the called procedure. Accordingly, it becomes less easy to change and maintain a program. Moreover, details of the callee are not always laid open. Even if the details are laid open, the reference conditions are not always public functions and public members, which can be called from the caller. Hence, it may be theoretically impossible to insert the evaluation conditions into the source code of the caller.

Meanwhile, although the partial dead code elimination is a strong optimization technique as it is capable of eliminating an arbitrary dead code, a computational complexity thereof is extremely large as in a range from third to fifth powers of the number of operations. Hence, the partial dead code elimination is not suitable for use in such a compiler which performs dynamic compilation during program execution like a JIT (Just In Time) compiler in Java (trademark of Sun Microsystems in U.S.A.).

SUMMARY OF THE INVENTION

In this connection, it is an aspect of the present invention to make it possible to create an efficient program executing an eager evaluation of arguments in accordance with whether or not the arguments are referred to by a callee.

It is another aspect of the present invention to provide a compiler optimizing a program into the efficient program in compiling the program.

The present invention achieving the foregoing aspects is realized as a program converting apparatus, which reads a source code of an execution program, converts the read source code into a machine language code, and is configured in the following manner. Specifically, this program converting apparatus comprises: a code analysis unit for performing lexical and syntactic analyses of the source code; an optimization unit for transforming the execution program; and a code generation unit for converting the execution program transformed by this optimization unit into a machine language code.

Still another program converting apparatus of the present invention comprises: a code analysis unit; an optimization unit; and a code generation unit. This apparatus is characterized in that the optimization unit includes: first transforming means for detecting a calling procedure and a called procedure in a procedure call within the execution program, and in-lining the called procedure to the calling procedure; second transforming means for retracing a control flow from a head of the in-lined called procedure to obtain a predetermined operations, moving a reference condition, for referring to an argument in the called procedure, before these operations, and copying the operations to insert the copied operations into respective routes branched from the reference condition; and third transforming means for eliminating a dead operations on a route where the argument is not referred to among the operations inserted into the respective routes branched from the reference condition.

Moreover, another aspect of the present invention achieving the foregoing aspects is a program converting method, which controls a computer and transforms a program to be processed. The method is characterized by comprising: a first step of reading out the program to be processed from a predetermined storage device, and detecting a calling procedure and a called procedure in a procedure call within the program; and a second step of guarding an evaluation of an argument described in the calling procedure under a predetermined evaluation condition, transforming the program so that the evaluation is performed when referring to this argument, and storing the transformed program in a predetermined storage device.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE INVENTION

The present invention makes it possible to create an efficient program executing an eager evaluation of arguments in accordance with whether or not the arguments are referred to by a callee. It also provides a compiler optimizing a program into the efficient program in compiling the program.

In one embodiment, the present invention achieves the foregoing as a program converting apparatus, which reads a source code of an execution program, converts the read source code into a machine language code, and is configured in the following manner. Specifically, this program converting apparatus comprises: a code analysis unit for performing lexical and syntactic analyses of the source code; an optimization unit for transforming the execution program; and a code generation unit for converting the execution program transformed by this optimization unit into a machine language code. In addition, this apparatus is characterized in that that optimization unit detects a calling procedure and a called procedure in a procedure call within the execution program with respect to the execution program analyzed by the code analysis unit, guards an evaluation of an argument described in the calling procedure under a predetermined evaluation condition, and transforms the execution program so that the evaluation is performed when referring to the argument.

A condition set as this evaluation condition can be a simple condition under which the called procedure is guarded or a condition containing the above simple condition. Alternatively, this evaluation condition can be a reference condition for referring to the argument in the called procedure or a condition containing the reference condition.

Moreover, another program converting apparatus of the present invention comprises: a code analysis unit; an optimization unit; and a code generation unit. The apparatus is characterized in that the optimization unit detects a spot where a procedure call by passing an argument by value is performed within an execution program with respect to an execution program analyzed by the code analysis unit, and transforms the execution program to change an order of evaluating the argument and a reference condition in the spot where the procedure call is performed.

Still another program converting apparatus of the present invention comprises: a code analysis unit; an optimization unit; and a code generation unit. This apparatus is characterized in that the optimization unit includes: first transforming means for detecting a calling procedure and a called procedure in a procedure call within the execution program, and in-lining the called procedure to the calling procedure; second transforming means for retracing a control flow from a head of the in-lined called procedure to obtain a predetermined operations, moving a reference condition, for referring to an argument in the called procedure, before these operations, and copying the operations to insert the copied operations into respective routes branched from the reference condition; and third transforming means for eliminating a dead operations on a route where the argument is not referred to among the operations inserted into the respective routes branched from the reference condition.

In another embodiment, the present invention achieves the foregoing aspects as a program converting method, which controls a computer and transforms a program to be processed. The method is characterized by comprising: a first step of reading out the program to be processed from a predetermined storage device, and detecting a calling procedure and a called procedure in a procedure call within the program; and a second step of guarding an evaluation of an argument described in the calling procedure under a predetermined evaluation condition, transforming the program so that the evaluation is performed when referring to this argument, and storing the transformed program in a predetermined storage device.

Furthermore, another program converting method of the present invention is characterized by comprising: a first step of reading out a program to be processed from a predetermined storage device, and detecting a spot where a procedure call by passing an argument by value is performed within this program; and a second step of transforming the program to change an order of evaluating the argument and a reference condition in the spot where the procedure call is performed in the program, and storing the transformed program in a predetermined storage device.

Still further, still another program converting method of the present invention is characterized by comprising: a first step of reading out a program to be processed from a predetermined storage device, and detecting a calling procedure and a called procedure in a procedure call within this program; a second step of in-lining the called procedure to the calling procedure; a third step of retracing a control flow from a head of the in-lined called procedure to obtain a predetermined operations, moving a reference condition, for referring to an argument in the called procedure, before this operations, and copying these operations to insert the copied operations into respective routes branched from the reference condition; a fourth step of eliminating a dead operations on a route where the argument is not referred to among the operations inserted into the respective routes branched from the reference condition; and a fifth step of storing the program from which the dead operations are eliminated in a predetermined storage device.

Yet further, the present invention is realized as a program controlling a computer and realizing respective functions as the program converting apparatus described earlier, or a program causing the computer to execute processing corresponding to each of the steps in the above-described program converting method. This program can be provided by distributing a recording medium such as a magnetic disk, an optical disk and a semiconductor memory storing the program therein, and by being transmitted through a network.

Figure 1:
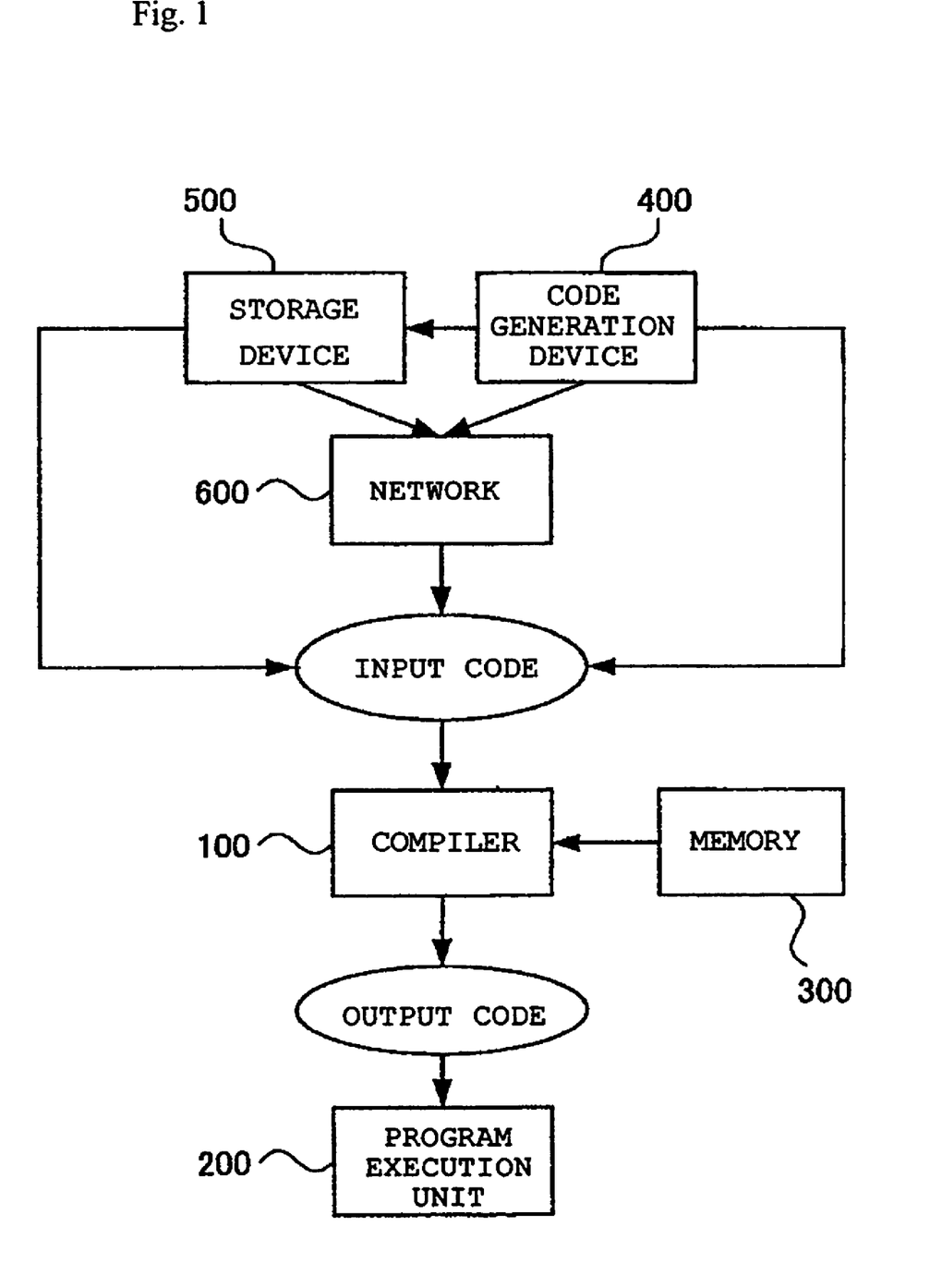
FIG. 1 is a diagram illustrating a system configuration of a computer system realizing a data processing method according to an embodiment of the present invention.

The present invention will be described in detail based on an embodiment shown in the accompanying drawings. FIG. 1 is a diagram illustrating a system configuration of a computer system realizing a data processing method according to this embodiment. Referring to FIG. 1, the computer system in this embodiment includes the compiler 100 for compiling a source program (input code), the program execution unit 200 for executing an object program (output code) compiled in the compiler 100 to perform various processing, and the memory 300. The compiler 100 and the program execution unit 200 are realized by a CPU subjected to program control in the computer system such as a personal computer and a workstation. The memory 300 is a main memory of a computer apparatus and realized by a RAM or the like. The memory 300 stores a program for controlling the CPU to be operated as the compiler 100 and a program to be compiled. In addition, variables saved from a register in the compiling processing of the compiler 100 are temporarily stored in the memory 300. It is needless to say that the programs stored in the memory 300 will be stored in an external recording device such as a magnetic disk as needed.

In FIG. 1, the compiler 100 receives and processes an input code described in a predetermined programming language, and generates and outputs an output code described in a machine language. This input of the input code is performed in a manner that an input code generated in the code generation device 400 is directly inputted, that the input code generated in the code generation device 400 is inputted from the storage device 500 storing the same input code therein, that the input code is inputted through the network 600 from the code generation device 400 and the storage device 500, which are present on the network 600, and so on. The output code generated by the compiler 100 is executed by the program execution unit 200.

Figure 2:
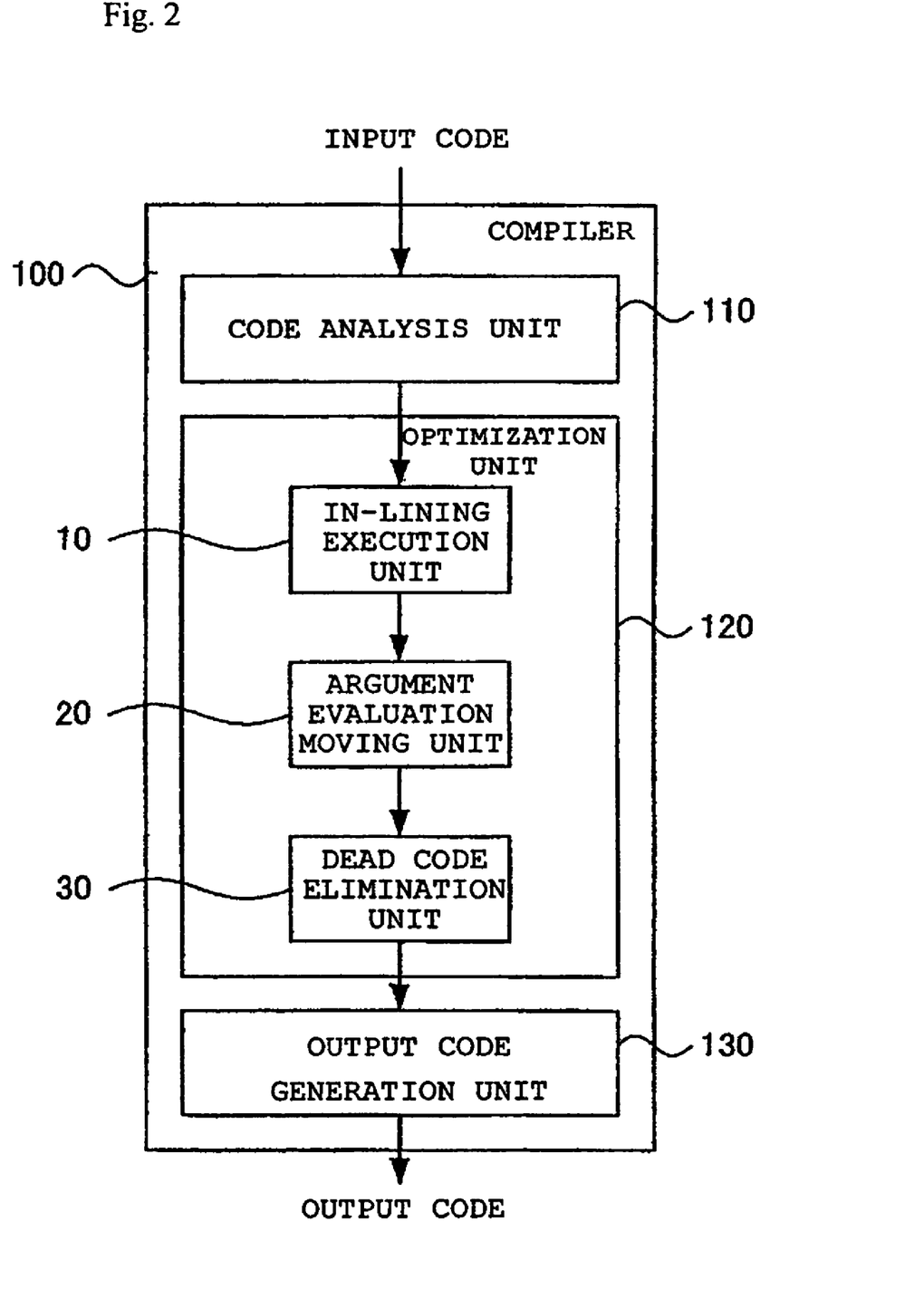
FIG. 2 is a diagram explaining a configuration of a compiler in this embodiment.

FIG. 2 is a diagram explaining the configuration of the compiler 100 in this embodiment. Referring to FIG. 2, the compiler 100 includes the code analysis unit 110 for performing lexical and syntactic analyses of the input code, the optimization unit 120 for transforming the program by various optimizations, and the output code generation unit 130 for converting the optimized program into (or generating) the output code and outputting the same output code.

Moreover, as functional units of the optimization unit 120, the compiler 100 includes the in-lining execution unit 10 for in-lining a predetermined procedure call portion, the argument evaluation moving unit 20 for moving a portion in the program, where an argument is evaluated, after a conditional branch (reference condition), and the dead code elimination unit 30 for eliminating a dead code generated in the processing of the argument evaluation moving unit 20.

The respective constituent elements of the compiler 100 shown in FIG. 2 are virtual software blocks implemented by the CPU controlled by a computer program. The computer program controlling the CPU is provided by distributing a recording medium such as a magnetic disk, an optical disk and a semiconductor memory storing the program therein, and by being transmitted through a network.

Note that the respective functional units of the optimization unit 120 shown in FIG. 2 relate to characteristic functions of this embodiment. Needless to say, although not particularly illustrated, there are actually various techniques other than the one described in this embodiment as means for program optimization, and these various techniques can be combined with the technique according to this embodiment.

According to this embodiment, in the procedure call that is a spot where the arguments are passed by value, the argument evaluation by the caller is guarded under appropriate conditions (evaluation conditions), and thus a redundant argument evaluation by the caller is avoided. Here, the evaluation conditions are usually identical to conditions for actually referring to the arguments by the callee (reference conditions). Specifically, the essence of the optimization according to this embodiment is a change of the evaluation order for the arguments and the reference conditions.

In general, an arbitrary computation can be inserted between the argument evaluation by the caller and the procedure call using the evaluated arguments. However, in the procedure call for a debug or an output of a message to a log, which is mainly optimized in this embodiment, the following tendency is remarkable; the evaluated arguments are not received as temporary variables but are directly described in an actual argument section of the procedure call (specifically, the argument evaluation is present immediately before the procedure call). Moreover, in the callee in this case, the entire procedure has a tendency to be guarded under a sole simple condition (reference condition) based on such a request of activating the functions during the debugging and tuning and of inactivating the functions in order to avoid a needless overhead during an actual operation. Therefore, operations immediately before the conditional branch (reference condition) are moved after the conditional branch and before a portion referring to the arguments, thus enabling the optimization for reducing the redundant argument evaluation.

In order to avoid a non-occurrence of a side effect that is supposed to occur and an occurrence of a side effect that is not supposed to occur, due to the inversion of the evaluation order of the arguments and the reference condition, the argument evaluation must not cause the side effect when the evaluation conditions (obtained by synthesis with the reference condition) cause the side effect. Here, the side effect is an exception, escape of a value or the like. The evaluation conditions can be changed (simplified) for the reasons such as the elimination of the side effect, the reduction of the computational complexity. However, in this case, the changed evaluation conditions are determined so as to contain original evaluation conditions.

Furthermore, for the sake of convenience in synthesizing the evaluation conditions from the reference condition that is a code of the callee, it is required that a set of the callee on a call point thereof be determined during a compilation of the caller. This condition is satisfied in a static call in which the callee is uniquely determined, a dynamic call statically bound by a test code, and a dynamic call as in a virtual function of C++, which is not accompanied with an overload during execution of a method. A dynamic call like a virtual function of Java, which is accompanied with the overload during execution of the method, executes the optimization according to this embodiment only on the known callee when the caller is compiled. This optimization is executed by detecting that the set of the callee is changed during the execution, the dynamic call is used in combination with a runtime patching the code to a safe side. Moreover, if the set of the known callee is composed of a plurality of elements when the caller is compiled, each element is bound uniquely and statically by use of a test code, and then the optimization according to this embodiment is executed therefore.

In the configuration illustrated in FIG. 2, in the procedure call in the program, the in-lining execution unit 10 examines whether the above-described conditions such as the side effect and the uniqueness of the callee are satisfied. Then, the in-lining execution unit 10 embeds the called procedure in the caller for in-lining. The in-lining itself is a technology which is conventionally well-known as one of the optimization techniques (for example, refer to Non-patent literature 3). The conventional in-lining technique can also be applied to this embodiment.

The argument evaluation moving unit 20 moves a portion of the argument evaluation on the caller after the reference condition (evaluation condition). Here, the caller and the callee are no longer distinguished due to the in-lining. However, the caller and the callee will be referred to as they are for the sake of convenience. With regard to the movement described above, specifically, a control flow analysis is first performed from a head of the called procedure in-lined by the in-lining execution unit 10 in a reverse direction. Then, the control flow is retraced to a first operation of a basic block where controls are merged. When the evaluation conditions cause the side effect, the control flow is retraced to an operation immediately after a lowermost operation causing the side effect with the first operation of the basic block where the controls are merged taken as an upper limit. Then, the reference condition is moved before the obtained operations and set as the evaluation condition. Additionally, the operations are copied and inserted into the respective routes immediately after the evaluation condition. Thus, the order of evaluating the arguments and the reference condition (evaluation condition) is changed in the operations of the program. Note that, when the reference condition is moved and set as the evaluation condition, the evaluation condition can be simplified as described earlier as required.

Here, in this embodiment, the operations which were present on the original caller will be moved to the callee across an approximate length of one basic block immediately before the caller.

Figure 3:
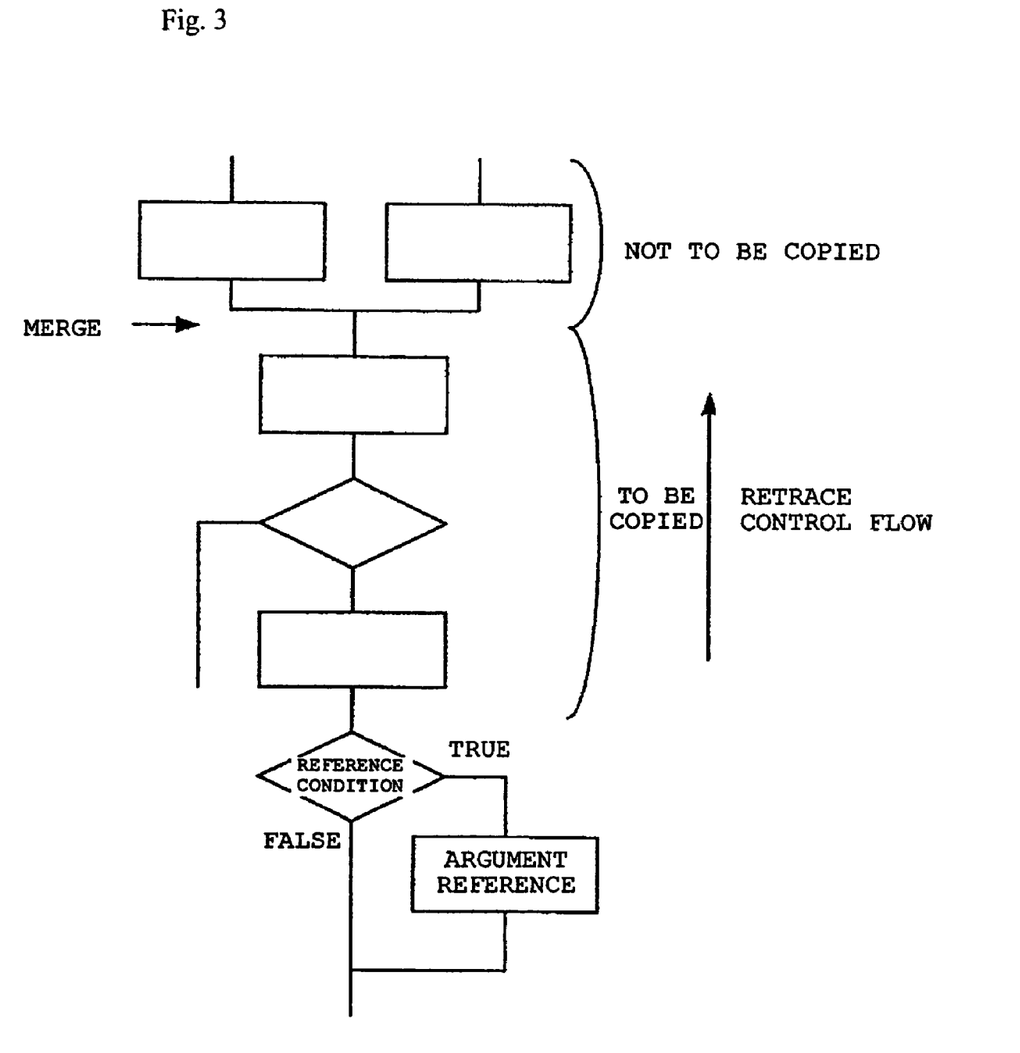
FIG. 3 is a diagram explaining a range where a control flow is retraced in this embodiment.

FIG. 3 is a diagram explaining a range where the control flow is retraced. As illustrated in FIG. 3, the operations are copied with the merge of the controls taken as the upper limit, and the copied operations are moved after the reference condition (evaluation condition). However, the upper limit does not mean an upper limit of theoretically copyable and movable operations. Rationally, it is possible to retrace the control flow without any limits by the control flow analysis and to move the copied operations after the reference condition (evaluation condition). Hence, the control flow may be retraced beyond the merge of the controls, and the copied operations may be moved after the reference condition (evaluation condition).

Figure 4:
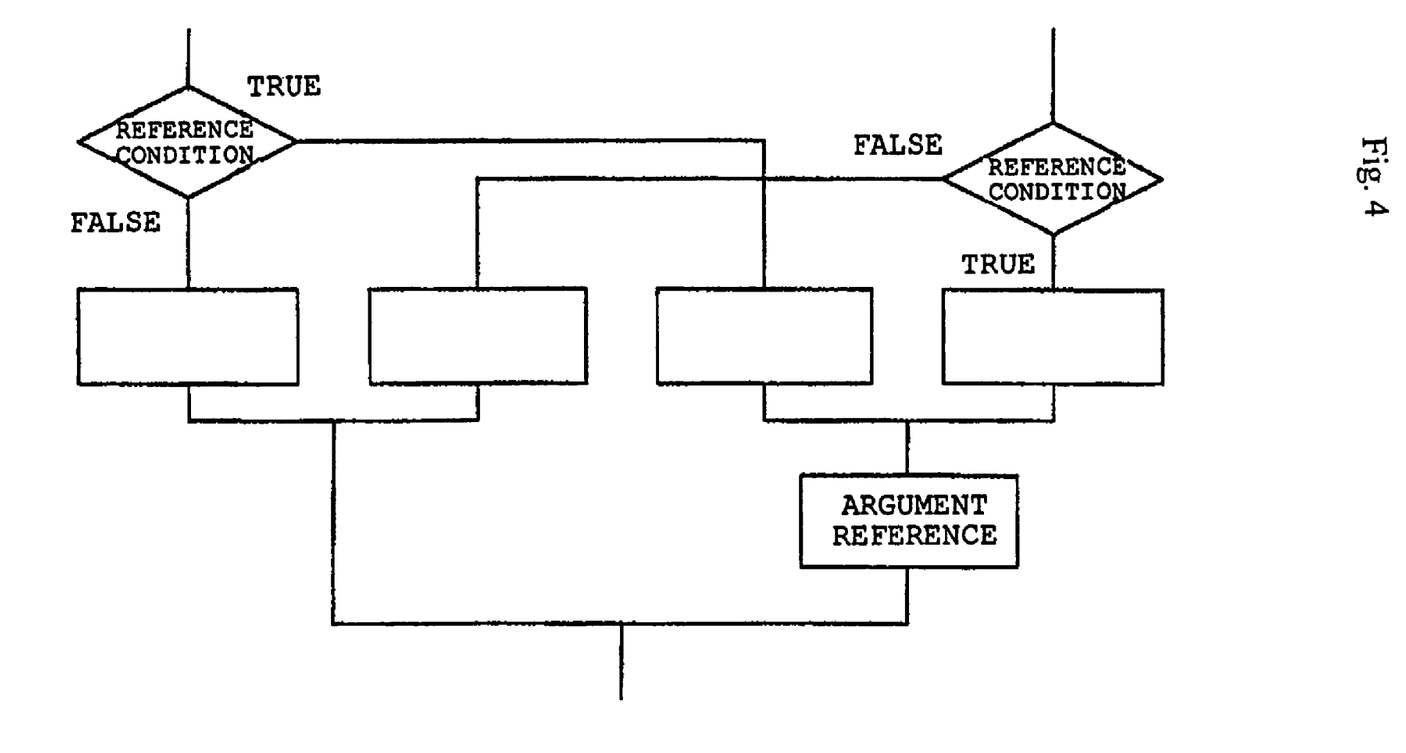
FIG. 4 is a diagram illustrating a state where operations in a range beyond a merge of controls are moved after reference conditions (evaluation conditions) in this embodiment.

FIG. 4 is a diagram illustrating a state where operations in a range beyond the merge of the controls are moved after the reference conditions (evaluation conditions).

However, in the procedure call for a debug or an output of a message to a log, which is mainly optimized in this embodiment, a tendency is remarkable; the evaluated arguments are not received as temporary variables but are directly described in an actual argument section of the procedure call (specifically, the argument evaluation is present immediately before the procedure call). Therefore, it can be said that the effect of optimization is hardly changed even if the operations are moved beyond the merge. Hence, practically, it is satisfactory as long as the control flow is retraced to the first operation of the basic block where the controls are merged (or to the operation immediately after the lowermost operation causing the side effect with the first operation of the basic block taken as the upper limit) and the copied operations are moved after the reference condition (evaluation condition) in the manner as described above.

Note that the above-described copies of the operations are not performed for a selected operation which evaluates the arguments but for the entire operations in a range obtained by the control flow. Thus, complicated work such as an analysis of individual operations can be avoided.

The dead code elimination unit 30 eliminates dead operations among the operations including the argument evaluations, which have been moved to the respective routes immediately after the evaluation conditions by the argument evaluation moving unit 20. Specifically, the argument evaluation moving unit 20 simply moves the operations after the conditional braches and only copies the same. Accordingly, no matter whether the evaluation conditions are true or false, the operations including the argument evaluations are inserted into the respective routes. Therefore, the dead code elimination unit 30 examines whether the evaluation conditions are true or false and eliminates the argument evaluations copied on routes where the evaluation conditions become false by the dead code elimination. Note that, a conventional method known as an optimization technique (for example, refer to Non-patent literature 4) can be applied to this dead code elimination.

Figure 5:
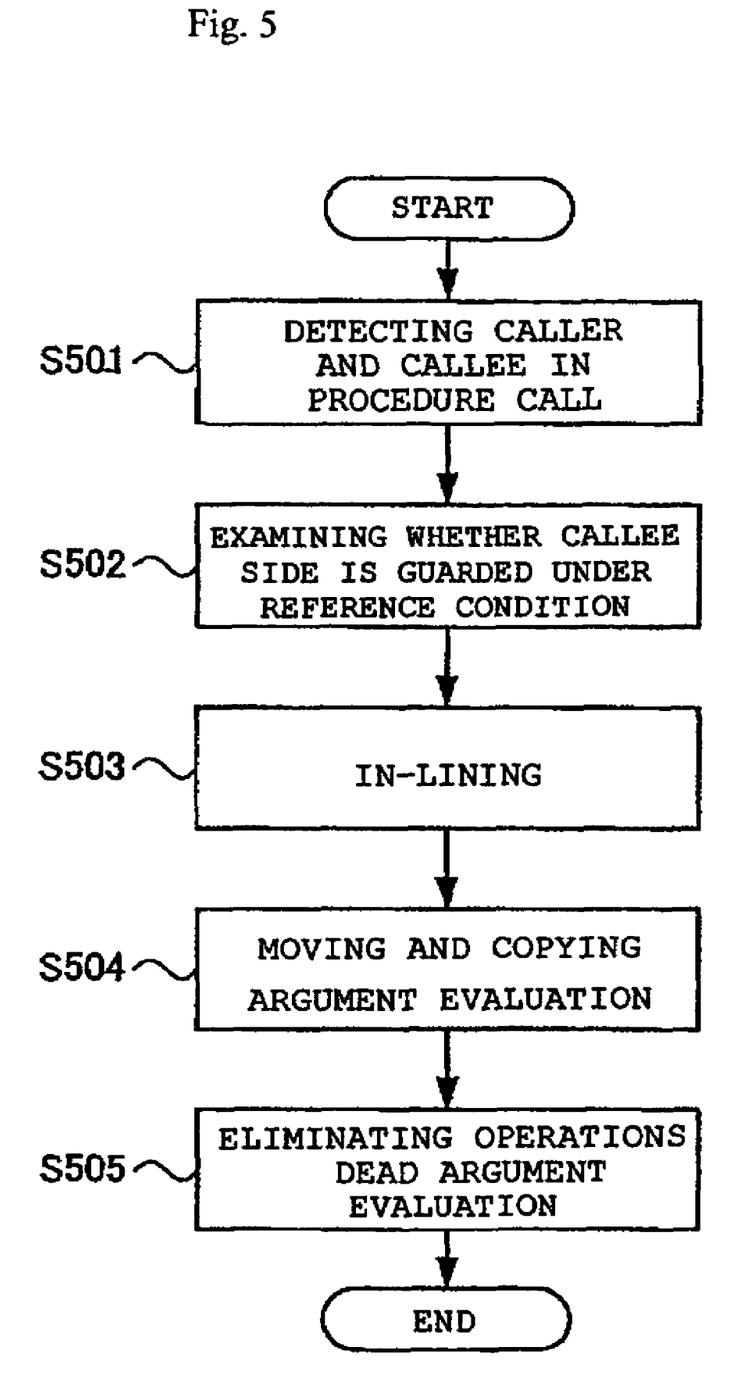
FIG. 5 is a flowchart explaining an entire flow of optimization processing according to this embodiment.

Next, an operation of the optimization according to this embodiment will be specifically described. FIG. 5 is a flowchart explaining the entire flow of the optimization processing according to this embodiment. FIGS. 6 to 9 are diagrams explaining changes of the control flow of the program by the optimization of this embodiment.

it is assumed that, as an initial operation, the compiler 100 receives a program to be processed, and processing such as lexical and syntactic analyses have already been performed therefor. The program (intermediate code) that has been analyzed is temporarily stored in the memory 300.

Figure 6:
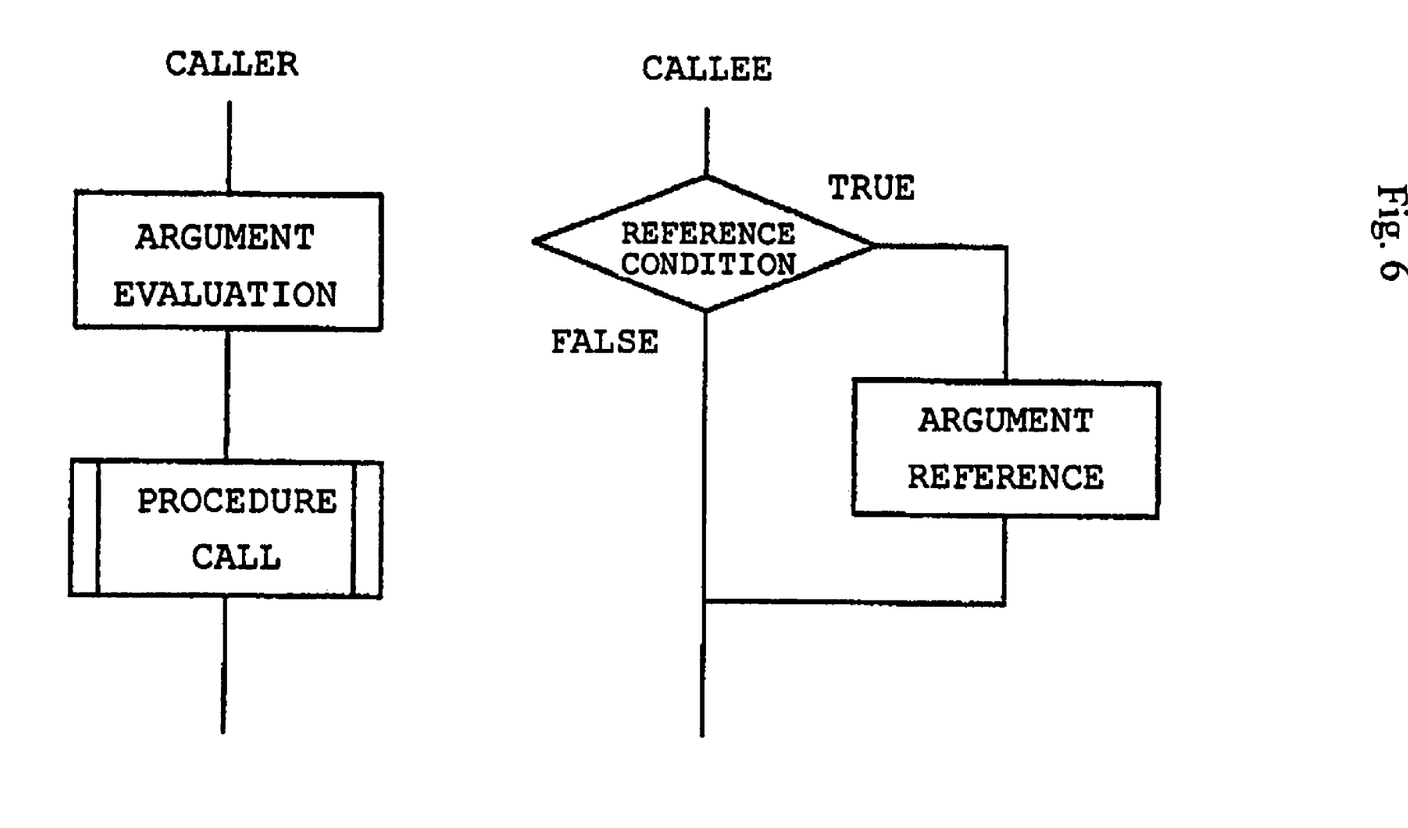
FIG. 6 is a diagram explaining a change of a control flow of a program by optimization of this embodiment, illustrating examples of control flows of detected caller and callee.

As illustrated in FIG. 5, in the compiler 100, the caller and the callee in the procedure call in the program to be processed are detected by means of the control flow analysis or the like (Step 501). FIG. 6 is a diagram illustrating examples of control flows for the detected caller and callee. In FIG. 6, the procedure of the callee is called by the "procedure call" of the caller, and is executed.

Next, the in-lining execution unit 10 of the compiler 100 examines whether the entire callee in the procedure call, which is detected in Step 501, is guarded under the sole simple condition (reference condition) (Step 502). The callee in the procedure call, which is illustrated in FIG. 6, satisfies this condition. Accordingly, next, the in-lining execution unit 10 in-lines the callee into the caller (Step 503). The in-lined program to be processed is stored in the memory 300.

Figure 7:
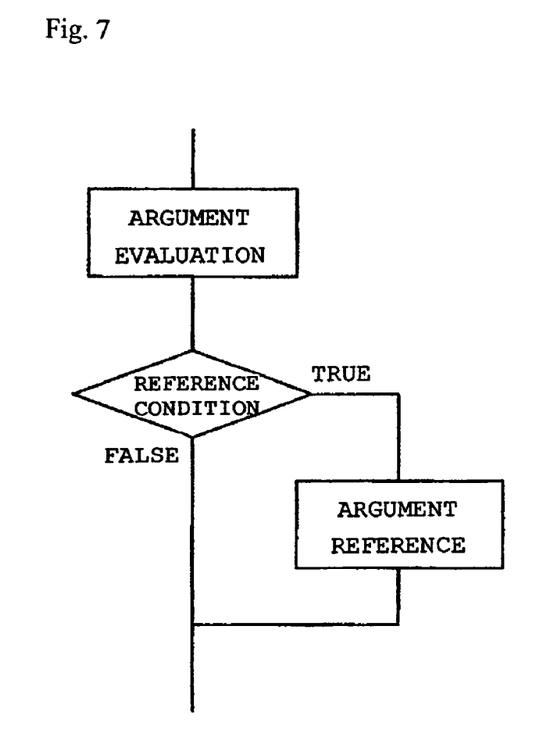
FIG. 7 is a diagram explaining a change of the control flow of the program by the optimization of this embodiment, illustrating a state where one of the control flows illustrated in FIG. 6 is in-lined to the other.

FIG. 7 is a diagram illustrating a state where the control flows illustrated in FIG. 6 is in-lined. In this state, the "argument evaluation" is present before the "reference condition."

Next, the argument evaluation moving unit 20 reads out the program from the memory 300, and retraces the control flow from the head of the in-lined procedure (originally, the callee) in the reverse direction. Then, the argument evaluation moving unit 20 obtains operations to the first operation of the basic block where the controls are merged (or to an operation immediately after a lowermost operation causing a side effect with the first operation of the basic block taken as the upper limit). Subsequently, the argument evaluation moving unit 20 moves the reference condition before the operations to set the reference condition as the evaluation condition, and copies the operations to insert the copied operations into the respective routes immediately after the evaluation condition (Step 504). The program that has been transformed by the argument evaluation moving unit 20 is held in the memory 300.

Figure 8:
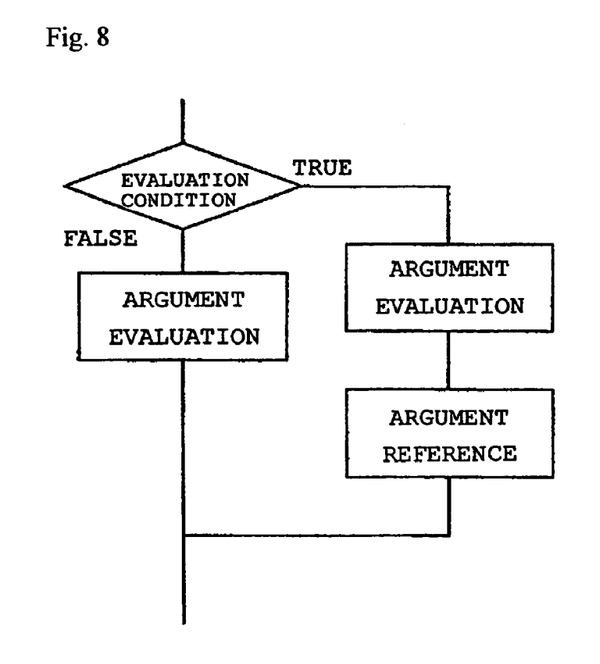
FIG. 8 is a diagram explaining a change of the control flow of the program by the optimization of this embodiment, illustrating a state where an "argument evaluation" is moved after a conditional branch from the state of FIG. 7.

FIG. 8 is a diagram illustrating a state where the "argument evaluation" is moved after the conditional branch from the state illustrated in FIG. 7. In FIG. 8, a conditional branch called the "evaluation condition" replaces the "reference condition," and the "argument evaluation" is inserted into both of the true and false routes.

Finally, the dead code elimination unit 30 reads out the program from the memory 300, and eliminates dead operations of argument evaluations among the argument evaluations inserted into the respective routes after the evaluation condition by the argument evaluation moving unit 20 (Step 505). The programs from which the dead operations are eliminated are held in the memory 300.

Figure 9:
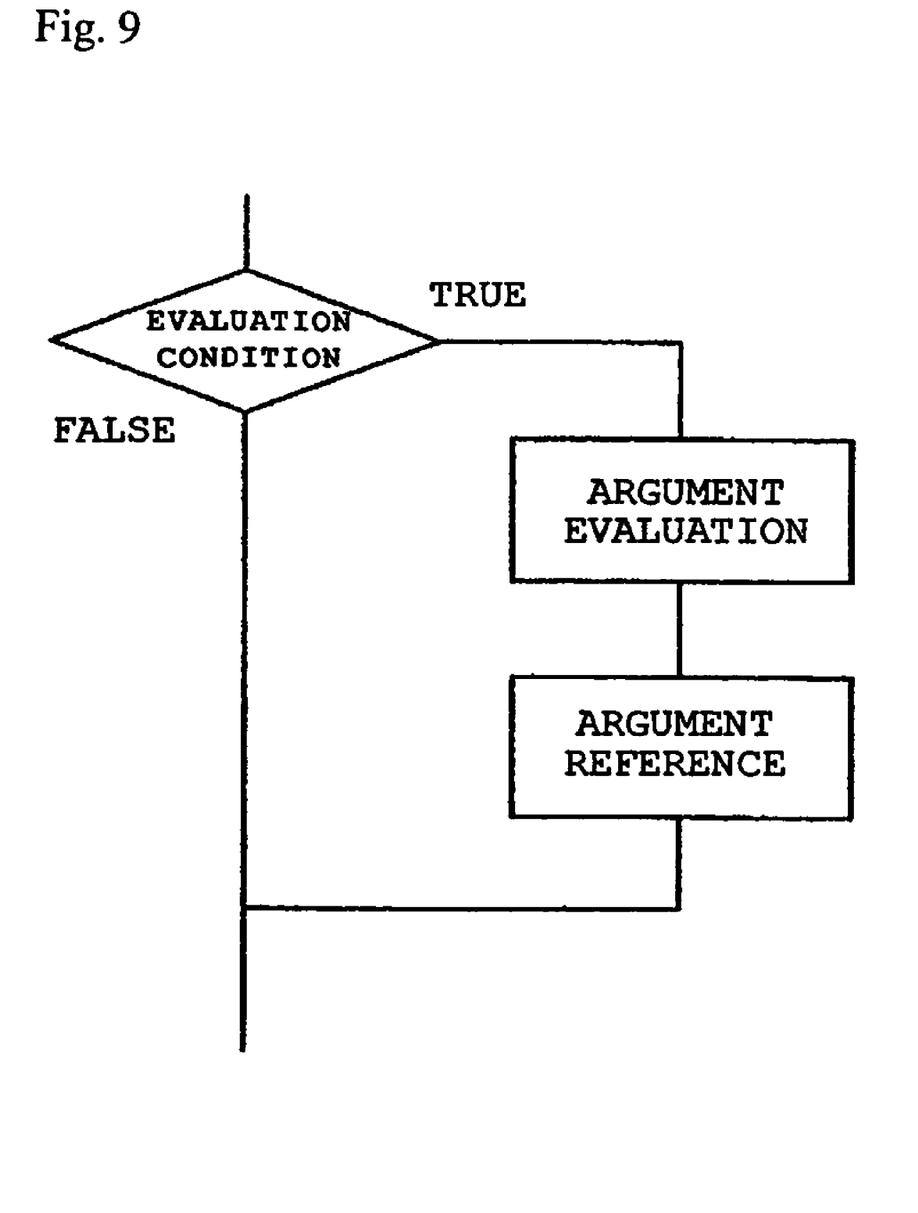
FIG. 9 is a diagram explaining a change of the control flow of the program by the optimization of this embodiment, illustrating a state where a dead "argument evaluation" is eliminated from the state of FIG. 8.

FIG. 9 is a diagram illustrating a state where the dead "argument evaluation" is eliminated from the state in FIG. 8. In FIG. 9, the "argument evaluation" that was present in the route where the "argument reference" is not performed (false route in the "evaluation condition") is deleted.

Thereafter, the optimized program is converted into an object code, and the object code is executed by the program execution unit 200 illustrated in FIG. 1.

In the hitherto-described manner, in this embodiment, the condition (evaluation condition) derived from the condition (reference condition) for referring to the argument of the callee can be automatically inserted into the caller by the compiler 100 when the program is compiled. Unlike the change to the lazy evaluation, which can be set at the Scheme, troublesome work of source code rewriting is not required. In addition, the eager evaluation is used for the evaluation of the arguments in the case where the evaluation condition is satisfied, thus making it possible to maintain the advantage in the substantial reduction of the latency.

Moreover, in this embodiment, the compiler 100 can automatically insert the evaluation condition into the caller when the program is compiled. Unlike the case where a developer of the program manually inserts the evaluation condition into the source code of the caller, the reference conditions remain aggregated in the callee on the source code. Therefore, it is still easy to change and maintain the program. In addition, it is not necessary to be aware of implementation details when inserting the evaluation condition into the caller, or no limitations are placed on access rights.

Furthermore, in this embodiment, the dead codes are eliminated after changing the orders of the argument evaluation and reference condition (evaluation condition) evaluation, and a computational complexity thereof is only a first power of the number of basic blocks (the number of operations in the case where the evaluation condition causes the side effect). Hence, unlike the conventional partial dead code elimination requiring an extremely large computational complexity as in a range from third to fifth powers of the number of operations, this embodiment is suitable for use in a compiler performing a dynamic compilation during execution of the program.

As described so far, according to the present invention, it is possible to create an efficient program performing the eager evaluation of the arguments in accordance with whether or not the eager evaluation is required by the callee. In addition, according to the present invention, it is possible to provide a compiler optimizing a program into such an efficient program when the program is compiled.

Variations described for the present invention can be realized in any combination desirable for each particular application. Thus particular limitations, and/or embodiment enhancements described herein, which may have particular advantages to the particular application need not be used for all applications. Also, not all limitations need by implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

Although the preferred embodiment of the present invention has been described in detail, it should be understood that various changes, substitutions and alternations can be made therein without departing from spirit and scope of the inventions as defined by the appended claims.

What is claimed is:

1. A method for the conversion processing of a program the method comprising the steps of:

reading out the program to be processed from a predetermined storage device;

detecting a calling procedure and a called procedure in a procedure call within the program;

in-lining the called procedure to the calling procedure;

retracing a control flow from a head of the in-lined called procedure to obtain a plurality of predetermined operations, moving a reference condition for referring to an argument in the called procedure before the operations, and copying the operations to insert the copied operations into respective routes branched from the reference condition;

eliminating a dead operations on a route where the argument is not referred to among the operations inserted into the respective routes branched from the reference condition; and storing the program from which the dead operations is eliminated in a predetermined storage device.

2. The method of claim 1, further comprising the step of moving a reference condition, for referring to an argument in the called proceduce, before the operations.

3. The method of claim 1, further comprising the step of copying the operations to insert the copied operations into respective routes branched from the reference condition.

* * * * *